United States Patent [19]
Nishitani

[11] Patent Number: 5,694,628
[45] Date of Patent: Dec. 2, 1997

[54] VIEW FINDER FOR CAMERA

[75] Inventor: Yasuhiro Nishitani, Saitama, Japan

[73] Assignee: Fuji Photo Film Co., Ltd., Kanagawa, Japan

[21] Appl. No.: 655,900

[22] Filed: May 31, 1996

[30] Foreign Application Priority Data

May 31, 1995 [JP] Japan .................. 7-133570

[51] Int. Cl.⁶ .................................. G03B 13/02
[52] U.S. Cl. .................. 396/379; 396/373; 396/382
[58] Field of Search .................. 396/373, 377, 396/378, 379, 382

[56] References Cited

U.S. PATENT DOCUMENTS

| | | | |
|---|---|---|---|
| 4,268,151 | 5/1981 | Kobori et al. | 396/382 |
| 4,712,897 | 12/1987 | Crema | 396/373 |
| 5,083,149 | 1/1992 | Kudo et al. | 396/373 |
| 5,546,224 | 8/1996 | Yokota | 396/373 |
| 5,563,670 | 10/1996 | Tenmyo | 396/373 |
| 5,585,965 | 12/1996 | Hayashi et al. | 396/377 |

*Primary Examiner*—Russell E. Adams
*Attorney, Agent, or Firm*—Young & Thompson

[57] ABSTRACT

A camera view finder has a movable eyepiece lens barrel which is automatically shifted in the optical axis to a specific axial position in which the view finder protrudes from the camera body and provides dioptric power suitable for normal eyesight photographers when powering on the camera, to an additional axial position and to shifted back within the camera body when powering off camera.

17 Claims, 3 Drawing Sheets

VIEW FINDER FOR CAMERA

BACKGROUND OF THE INVENTION

1. Field of the Invention

This invention relates to a camera finder, and, more particularly a view finder with a feature of variable dioptric power.

2. Description of Related Art

Built-in finders are classified to several types according to types of finder optical systems and finder constructions, such as direct view finders, virtual type view finders and real image type view finders and so forth. Such a view finder usually has an eyepiece lens whose diopter is in a range between 0.5 and −1 which is considered to be most suitable for photographers to easily enjoy clear observation of an object. Photographers who have shortsightedness or farsightedness, however, often encounter difficulty observing an object through the view finder due to blurring of a finder image.

In order for shortsighted photographers and farsighted photographers to see a clear image in a view finder, some types of view finders have finder optical systems adjustable in dioptric power according to photographers' eyesight. While such a dioptric power variable type view finder provides clear view for a photographers, when the camera of a type having the dioptric power variable view finder is used by several photographers, the photographers must adjust the dioptric power of the view finder to their eyesight whenever intending to use the camera, which is always troublesome and uncomfortable.

Since an eyepiece frame of the view finder incorporated in a camera is almost even with a back wall of the camera, a photographer's nose interferes, resulting in inconvenience when observing an object through the view finder. Thus, the camera does not always allows photographers to put their eyes at a similar distance from the eyepiece frame due, for instance, to different heights of their noses with different framing effects.

In order to avoid the difficulty, there has been proposed in, for instance, Japanese Utility Model Publication No. 35-31259 a pull-out type of view finder which is manually pulled out before use and pushed in after use. This view finder, however, still does not easily provide a clear observation of an image, for a plurality of photographers.

SUMMARY OF THE INVENTION

It is an object of the present invention to provide a view finder with a feature of an automatic adjustment in dioptric power according to a photographers' eyesight.

It is an object of the present invention to provide a view finder which provides easy and clear observation of an object.

These objects of the present invention are achieved by providing a view finder having an eyepiece lens group mounted in an eyepiece lens barrel which is shifted back and forth in the finder axis by a drive means, such as a reversible electric motor. A view finder control means having a data memory for storing position data representative of a specific axial position of the eyepiece lens barrel in which the view finder provides dioptric power suitably for photographers who have ordinary eyesight of, for instance, approximately −1, drives a drive means to shift the eyepiece lens barrel out to the specific axial position based on the specific axial position data when electrically powering on the camera and to shift the eyepiece lens barrel back within the camera when electrically powering off the camera.

Since the view finder protrudes whenever the camera is powered on and prevents interference of a photographer's nose with the back wall of the camera, it ensures convenient and facile observation of an object with the same framing effect in spite of differences among photographers.

According to another aspect of the invention, the view finder may be further provided with a dioptric power variable feature. Specifically, the view finder control means has a position shift switch for driving the drive means to shift the eyepiece lens barrel, and hence the eyepiece lens, during continuous operation of the position shift switch; a position detecting means for detecting an axial position of the eyepiece lens barrel instantaneously at a time the continuous operation of the position shift switch is released and at least a position data entry/retrieval button for entering additional position data representative of the axial position of the eyepiece lens barrel detected by the position detecting means in the data memory following the operation of the position shift switch, and for causing the control means to drive the drive means to shift the eyepiece lens barrel further to an axial position based from the specific axial position based on the additional position data whenever operated following powering on the camera but before operating the position shift switch.

The view finder having the position data memory means liberates a photographer who has abnormal eyesight from preparatory camera operation for a dioptric power adjustment, such as attaching an extra eyepiece lens for changing the dioptric power of the finder and operating a dioptric power adjusting ring incorporated in the view finder, after the use of the camera by a photographer having different eyesight, i.e. shortsightedness or farsightedness.

Two position data entry/retrieval buttons may be provided, one for a shortsighted photographer and another one for a farsighted photographer. The utilization of two position data entry/retrieval buttons enables photographers of three different eyesights, including at least a normal eyesight photographer, a shortsighted photographer and a farsighted photographer, to use the camera in common without adjusting the dioptric power of the view finder prior to use.

BRIEF DESCRIPTION OF THE DRAWINGS

The above and other objects and features of the present invention will be clearly understood from the following description with respect to a preferred embodiment thereof when considered in conjunction with the accompanying drawings, in which.

DETAILED DESCRIPTION OF THE SPECIFIC EMBODIMENTS

Because electrically operated cameras are well known, the present description will be directed in particular to elements forming part of, or cooperating directly with, a view finder in accordance with the present invention. It is to be understood that elements not specifically shown or directly described can take various forms well known to those skilled in the photographic art.

Figure 2:
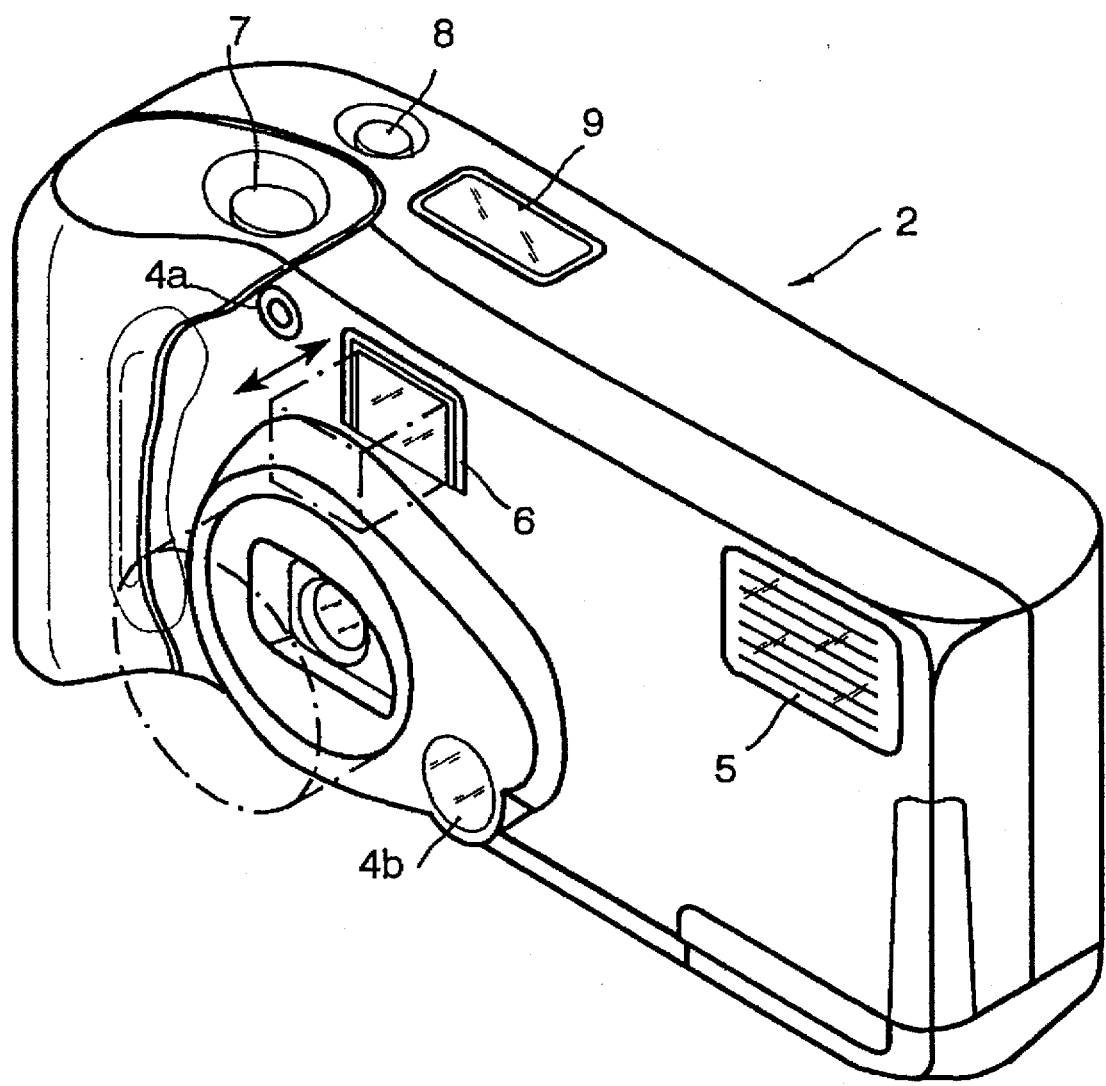
FIG. 2 is a perspective front view showing the appearance of the camera of FIG. 1.
Figure 3:
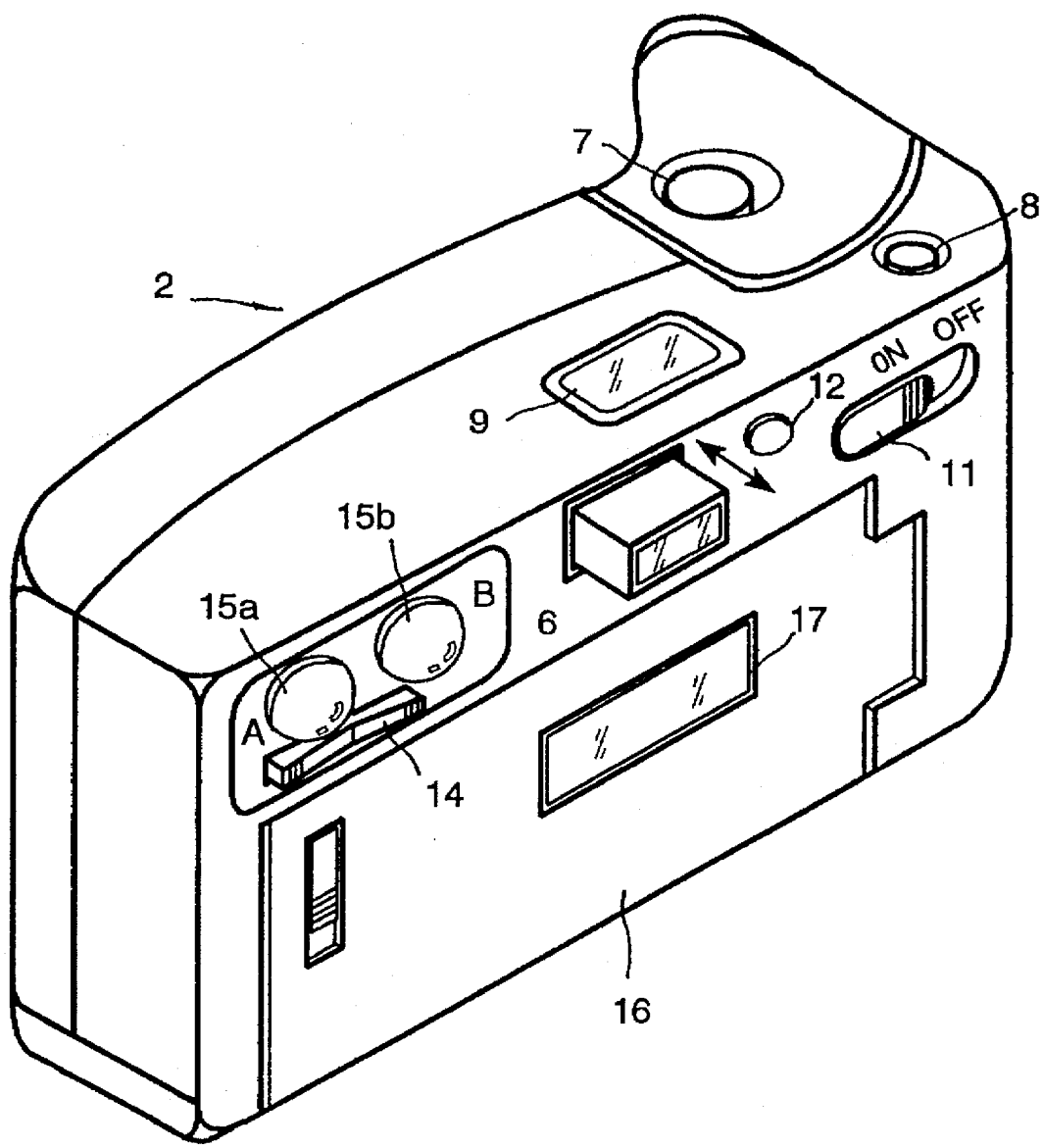
FIG. 3 is a perspective rear view showing the appearance of the camera of FIG. 1.

Referring to the drawings in detail, in particular, to FIGS. 2 and 3 showing a camera 2 equipped with a view finder 6 of this invention built therein, the camera 2 is equipped with a zoom lens 3, an active type automatic focusing device including a light emitting window 4a and a light receiving window 4b disposed in a front wall of the camera body, and an electronic flash device having a flash light window 5 disposed in the front wall of the camera body. Each of these active type automatic focusing device and electronic flash device has been well known in various forms to those skilled in the art and may take any known form. The camera 2 has a shutter release button 7, a zooming button 8 and an exposure counter window 9, all of which are disposed on the top wall of the camera body. Further, the camera 2 has a main power switch 11, a flash charge lamp 12 for indicating the conclusion of charging the electronic flash device, a position shift switch 14 which is used to drive an optical system drive mechanism 13 (which will be described in detail later) so as to adjust dioptric power of a finder optical system, and data selection buttons 15a and 15b which are used to selectively retrieve or read out dioptric power data. Provided on the camera rid 16 is a data display 17 for displaying data, such as a date of exposure, to be recorded on a film.

Figure 1:
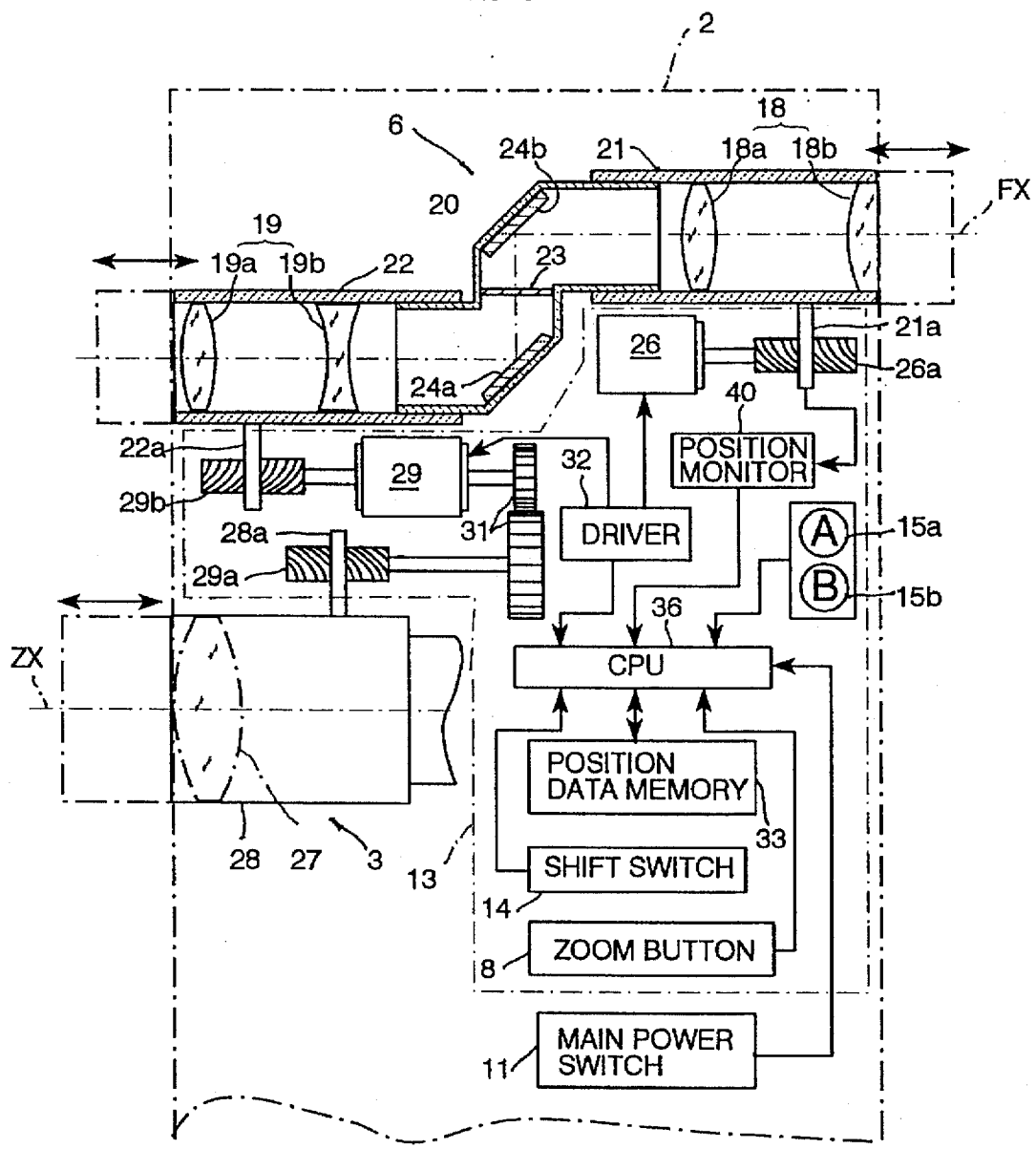
FIG. 1 is a schematic illustration showing a camera equipped with a view finder in accordance with an embodiment of the invention.

As shown in FIG. 1, the view finder 6, which is of a real image type, has an finder optical system comprising a two element eyepiece lens 18 and a two element objective lens 19. The two element eyepiece lens 18 comprises two single lenses 18a and 18b fixedly mounted in a movable eyepiece lens barrel 21. Similarly, the two element objective lens 19 comprises two single lenses 19a and 19b fixedly mounted in a movable objective lens barrel 22. These lens barrels 21 and 22 are offset from each other and movable back and forth in a direction in parallel with an optical axis ZX of the zoom lens 3. The finder lens system further comprises a reflection mirror 24a placed at a distance behind the objective lens 19 which turns the optical axis FX of the finder lens system upward at a right angle, a reflection mirror 24b placed at a distance in front of the eyepiece lens 18 which turns the optical axis FX of the finder lens system backward at a right angle, and a focusing screen 23 placed perpendicularly to the finder optical axis FX between the reflection mirrors 24a and 24b. The focusing screen 23 and mirrors 24a and 24b are fixedly mounted in a stationary barrel 20. The movable lens barrels 21 and 22 are mechanically independently moved close to and away from the focusing screen 23 and maintained even with the camera walls when fully retracted. The zoom lens 3 simply shown by a single lens element 27 is mounted in a movable taking lens barrel 28. This taking lens barrel 28 projects from the camera body when zoomed in.

Eyepiece lens barrel 21 has an integral worm pin arm 21a in engagement with a worm 26a fastened to a first pulse motor 26 of the optical system drive mechanism 13. Similarly, the objective lens barrel 22 has an integral worm pin arm 22a in engagement with a worm 29b fastened to a second motor 29 of the optical system drive mechanism 13. The taking lens barrel 28 has an integral worm pin arm 28a in engagement with a worm 29a linked to the second motor 29 of the optical system drive mechanism 13 through a gear train 31. Accordingly, the lens barrels 22 and 28 move together in similar axial directions when the second motor 29 rotates.

Optical system drive mechanism 13 for controlling the first and second motors 26 and 29 includes a driver circuit 32, a dioptric power data memory 33 and a central processing unit (CPU) 36 with which various externally operated switches and buttons, such as the main power switch 11, a position shift switch 14, position data entry/retrieval buttons 15a and 15b and a zoom button 8, are associated. The CPU 36 provides a control signal with which the driver circuit 32 causes the first and second motors 26 and 29 to rotate. The dioptric power data memory 33 stores data on a number of axial positions of the eyepiece lens barrel 21 which is used to make a correction of the dioptric power of the view finder 6 according to the eyesight of qualified users of the camera 2. Position data of the eyepiece lens 18 peculiar to a specific photographer is stored in the dioptric power data memory 33 by pushing the position shift switch 14 when the photographer can view a sharp image of an object through the view finder 6. The specific photographer is thus qualified to use the camera dioptric power data selection buttons 15a and 15b may then be selectively operated according to differences in eyesight between individuals, for instance shortsightedness and farsightedness, to retrieve the position data of the eyepiece lens barrel 21 from the dioptric power data memory 33. With the selected position data, the CPU 36 causes the driver circuit 32 to rotate the first motor 26 until the eyepiece lens barrel 21 attains an axial position defined by the position data. In this instance, the CPU 36 determines the number of pulses to be sent to the first motor 26 based on the position data. Operating the zoom button 8 causes the CPU 36 to control the second motor 29 so as to move the lens barrel 28, thereby changing the focal length of the zoom lens 3 to attain an intended angle of view. The objective lens barrel 22 follows the movement of the zoom lens barrel 28 to change the angle of view of the view finder 6 according to the focal length of the zoom lens 3. With the view finder 6 whose dioptric power of the optical system has been adjusted in this manner, an inverted real image of the object is formed by the objective lens 19 and is reflected by the mirror 24a and projected as an erected image on the focusing screen 23. The image on the focusing screen 23 is reflected by the mirror 24b and viewed as a magnified image through the eyepiece lens 18.

Prior to use of the camera 2, a dioptric power adjustment of the view finder 6 is made. When the main power switch 11 is pushed to power on the camera 2, the CPU 36 retrieves position data representative of a normal position of the eyepiece lens barrel 21 in which the view finder 6 provides a standard or ordinary diopter, for instance minus one (−1) diopter, suitable for a photographer who has normal eyesight and sends a normal position control signal to the drive circuit 32 so as to drive the first motor 26, thereby automatically shifting the eyepiece lens barrel 21 along the finder optical axis FX through the engagement between the worm 26a and pin 21a by a distance determined by the number of pulses to the normal position. When the eyepiece lens barrel 21 occupies the normal position, the photographer having normal eyesight can see a sharp image of the object on the focusing screen 23 through the view finder 6.

Whenever the view finder 6 is adjusted in dioptric power to place the finder eyepiece 18 in the normal position, although the photographer who has normal eyesight can see a sharp image on the focusing screen 23, both shortsighted photographer and farsighted photographers can see only a blurred image on the focusing screen 23. In order to avoid such an inconvenient situation, the view finder 6 is previously adjusted in dioptric power suitably for a shortsighted photographer A and a farsighted photographer B who have been qualified to use the camera 2. Specifically, prior to first use of the camera 2, the shortsighted photographer A pushes the position shift switch 14 to continuously shift the eyepiece lens barrel 18 from the normal position seeing an object through the finder eyepiece 18 until the shortsighted photographer A can observe a sharp image of the object on the focusing screen 23. During pushing of the position shift switch 14, a position monitor 40, such as a potentiometer, continuously provides a position signal representative of an axial position of the eyepiece lens barrel 21, and hence the finder eyepiece 18. When the shortsighted photographer A releases the position shift switch 14 instantaneously when observing the sharpest image of the object on the focusing screen 23 and subsequently pushes the position data entry/retrieval button 15a, data on the axial position of the eyepiece 18 monitored and detected by the position monitor 40 in which the view finder 6 provides the most suitable diopter for the shortsighted photographer A is stored in the dioptric power data memory 33 which may be retrieved by pushing button 15a. This axial position of the eyepiece lens barrel 21 is far from the focusing screen 23 with respect to the normal position. Similarly, prior to first use of the camera 2, the farsighted photographer B pushes the position shift switch 14 to continuously shift the eyepiece lens barrel 18 from the normal position in a direction, opposite to the direction in which the eyepiece lens barrel 18 is shifted during an adjustment of the view finder 6, seeing an object through the finder eyepiece 18 until the farsighted photographer B can observe a sharp image of the object on the focusing screen 23. During pushing of the position shift switch 14, the position monitor 40 continuously provides a position signal representative of an axial position of the finder eyepiece 18. When the farsighted photographer B releases the position shift switch 14 instantaneously when observing the sharpest image of the object on the focusing screen 23 and subsequently pushes another position data entry/retrieval button 15b, data on the axial position of the eyepiece 18 monitored and detected by the position monitor 40 in which the view finder 6 provides the most suitable diopter for the farsighted photographer B is stored in the dioptric power data memory 33 which may be retrieved by pushing button 15b. This axial position of the eyepiece lens barrel 21 is close to the focusing screen 23 with respect to the normal position. Once the data on axial positions of the finder eyepiece lens 18 have been stored in the dioptric power data memory 33, the view finder 6, in particular the finder eyepiece 18, is always placed in the normal axial position following powering on the camera 2. When the qualified shortsighted photographer A pushes the position data entry/retrieval button 15a following powering on the camera 2 with the result of placing the finder eyepiece 18 in the normal position, the CPU 36 retrieves the data of axial position of the eyepiece lens barrel 21 as the dioptric power data suitable for the shortsighted photographer A from the dioptric power data memory 33 and causes the motor 26 through the drive circuit 32 to rotate and shift the eyepiece lens barrel 21 by a distance determined based on the number of pulses in conformity with the data of axial position to the axial position far from the focusing screen 23 with respect to the normal position. When the eyepiece lens barrel 21 reaches the axial position, the CPU 36 stops the motor 26. As a result, the dioptric power of the finder eyepiece 18 is changed suitably for the shortsighted photographer A, bringing the camera 2 ready for use by the shortsighted photographer A. Similarly, when the qualified shortsighted photographer B pushes the position data entry/retrieval button 15b following powering on the camera 2 with the result of placing the finder eyepiece 18 in the normal position, the CPU 36 retrieves the data of axial position of the eyepiece lens barrel 21 as the dioptric power data suitable for the farsighted photographer B from the dioptric power data memory 33 and causes the motor 26 through the drive circuit 32 to rotate to shift the eyepiece lens barrel 21 by a distance determined based on the number of pulses in conformity with the data of axial position to the axial position close to the focusing screen 23 with respect to the normal position. When the eyepiece lens barrel 21 reaches the axial position, the CPU 36 stops the motor 26. As a result, the dioptric power of the finder eyepiece 18 is changed suitably for the farsighted photographer B, bringing the camera 2 ready for use by the farsighted photographer B.

After the camera 2 is ready to be used, ordinary operation is performed to take a picture. Specifically, following zooming in or out an image in the view finder 6 by operating the zoom button 8, the shutter release button 7 is pushed to make an exposure. When operating the zoom button 8, the CPU 36 causes the motor 29 through the drive circuit 32 to rotate. As a result, by means of the worm and pin engagement, while the zoom lens barrel 28 is axially shifted forward through the worm 29a and pin 28a engagement to change the focal length of the zoom lens system 27, the objective lens barrel 22 of the view finder 6 is axially shifted through the worm 29b and pin 22a engagement to change of the field of view according to the focal length of the zoom lens system 27. At any focal length of the zoom lens 3, the qualified photographer can observe a sharp magnified erected image of an object on the focusing screen through the finder eyepiece lens 18 adjusted in dioptric power most suitably for the photographer. When the main power switch 11 is turned off after an exposure or exposures, the CPU 36 drives the motor 26 and 29 for a time necessary to retract all of the lens barrels 21, 22 and 28 within the camera body and stops the motor 26 and 29 at the conclusion of the retraction the lens barrels 21, 22 and 28.

Whenever the position data entry/retrieval button 15a, 15b is pushed following a dioptric power adjustment of the view finder by means of the position shift switch 14, the existing axial position data are replaced with data of the shifted position of the eyepiece lens barrel 21 as new dioptric power data in the dioptric power data memory 33. Accordingly, other photographers may be qualified for common use of the camera 2. The number of position data entry/retrieval buttons is not limited to two but may be increased according to the number of qualified photographers having different eyesight other than normal eyesight for common use of the camera. Both of the position data entry/retrieval buttons 15a and 15b may be used for different shortsighted photographers or different farsighted photographers.

The invention may be embodied in various types of view finders such as Newtonism finders, inverted Galilean type view finders, inverted Galilean type albada finders and so forth. These view finders may be incorporated in various types of cameras such as manual and automatic focusing cameras, fixed focus cameras and ordinary focus cameras and other types of zoom lens cameras.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. A view finder having a finder optical system including an objective lens group and an eyepiece lens group for a camera, comprising:

an eyepiece lens barrel mounting an eyepiece lens group of a finder optical lens group therein, said eyepiece lens barrel being movably incorporated in a camera;

drive means incorporated in said camera for shifting said eyepiece lens barrel back and forth along an optical axis of said finder optical system; and control means, having a data memory in which position data representative of a specific axial position of said eyepiece lens barrel is stored, for controlling said drive means to shift said eyepiece lens barrel to said specific axial position based on said specific axial position data when said camera is electrically powered on and to shift back said eyepiece lens barrel within said camera when said camera is electrically powered off.

2. A view finder as defined in claim 1, wherein said view finder has a dioptric power of approximately −1 at said specific axial position.

3. A view finder as defined in claim 1, wherein said drive means comprises a reversible electric motor and worm gear means linking said eyepiece lens barrel to said electric motor.

4. A view finder as defined in claim 1, wherein said control means further comprises, a manually operated position shift switch for driving said drive means to shift said eyepiece lens barrel during continuous operation of said position shift switch, position detecting means for detecting an axial position of said eyepiece lens barrel at a time said operation of said position shift switch is released, and at least a manually operated position data entry/retrieval button for entering and storing additional position data representative of an axial position of said eyepiece lens barrel detected by said position detecting means in said data memory when operated following operation of said position shift switch and for causing said control means to control said drive means to shift said eyepiece lens barrel further to said axial position from said specific axial position based on said additional position data whenever operated following powering on said camera but before operating said position shift switch, thereby changing a dioptric power of said view finder.

5. A view finder as defined in claim 1, wherein said control means further comprises at least one position data entry/retrieval button for changing a dioptric power of said view finder suitably for photographers having eyesight other than normal eyesight.

6. A view finder as defined in claim 5, comprising two said position data entry/retrieval buttons, one for changing said dioptric power of said view finder suitably for a shortsighted photographer and the other for changing said dioptric power of said view finder suitably for a farsighted photographer.

7. A view finder for a camera having a zoom lens, the view finder comprising two lens groups movable along an optical axis of the view finder, a first said lens group being an objective lens group adapted to be moved in coordination with a zoom lens of the camera, and a second said lens group being an eyepiece lens group adapted to be moved independently of said first lens group to vary a dioptric power of the view finder in response to an operator's command.

8. The view finder of claim 7, further comprising a housing for said second lens group which is adapted to extend outside of a body of the camera.

9. The view finder of claim 7, further comprising a memory for storing a position of said second lens group set by the operator's command.

10. The view finder of claim 7, further comprising a driver for moving said eyepiece lens group to a first position partially outside a body of the camera when the camera is turned on and to retract said barrel to a second position within the body of the camera when the camera is turned off.

11. The view finder of claim 7, further comprising a position shift switch for selectively moving said eyepiece lens group; and data processing means for storing a position of said eyepiece lens group selected by operation of said position shift switch.

12. The view finder of claim 11, wherein said data processing means is further for selectively moving said eyepiece lens group to a stored position without operation of said position shift switch.

13. A view finder for a camera comprising:

an eyepiece lens group in a movable barrel;

a driver for moving said barrel along an optical axis of the view finder;

control means comprising,
 a memory for storing positions of said barrel,
 a driver controller for operating said driver to move said barrel to a first one of said positions when the camera is turned on and to retract said barrel to a second one of the positions when the camera is turned off,
 a position shift switch for operating said driver to selectively move said barrel, and
 a data entry button for storing in said memory a further one of said positions selected by operation of said position shift switch.

14. The view finder of claim 13, wherein said data entry button is further for selectively operating said driver to move said barrel to said further one of said positions.

15. The view finder of claim 13, for a camera with a zoom lens, the view finder further comprising an objective lens group which is adapted to be moved in coordination with the zoom lens of the camera and independently of movement of said eyepiece lens group.

16. A view finder for a camera comprising:

an eyepiece lens group in a movable barrel;

a driver for moving said barrel along an optical axis of the view finder;

control means comprising,
 a memory for storing positions of said barrel,
 a driver controller for operating said driver to move said barrel to a first one of said positions when the camera is turned on and to retract said barrel to a second one of the positions when the camera is turned off, and
 a data entry/retrieval means for selectively operating said driver to move said barrel to a further one of said positions to change a dioptric power of the view finder for operators having eyesight other than normal.

17. The view finder of claim 16, wherein said data entry/retrieval means comprises two buttons, one for changing the dioptric power of the view finder for a shortsighted operator and a second for changing the dioptric power of the view finder for a farsighted operator.

* * * * *